United States Patent
Otomo (10) Patent No.: US 8,345,323 B2
(45) Date of Patent: Jan. 1, 2013

(54) IMAGE READING LENS SYSTEM AND IMAGE READING APPARATUS

(75) Inventor: Ryoko Otomo, Saitama (JP)

(73) Assignee: FUJIFILM Corporation, Tokyo (JP)

(*) Notice: Subject to any disclaimer, the term of this patent is extended or adjusted under 35 U.S.C. 154(b) by 377 days.

(21) Appl. No.: 12/822,787

(22) Filed: Jun. 24, 2010

(65) Prior Publication Data

US 2010/0328730 A1 Dec. 30, 2010

(30) Foreign Application Priority Data

Jun. 25, 2009 (JP) .............................. P2009-151148

(51) Int. Cl.
*H04N 1/04* (2006.01)
(52) U.S. Cl. .......... 358/474; 358/475; 358/505; 358/1.9
(58) Field of Classification Search ................... 358/474, 358/475, 505, 1.9
See application file for complete search history.

(56) References Cited

U.S. PATENT DOCUMENTS

| 4,997,265 A * | 3/1991 | Nishina ........................ 359/679 |
| 5,900,994 A | 5/1999 | Otomo et al. |
| 7,450,275 B2 * | 11/2008 | Nishina ........................ 358/474 |

FOREIGN PATENT DOCUMENTS

| JP | 9-101452 A | 4/1997 |
| JP | 9-113802 A | 5/1997 |
| JP | 2000-241701 A | 9/2000 |

* cited by examiner

*Primary Examiner* — Houshang Safaipour
(74) *Attorney, Agent, or Firm* — Birch, Stewart, Kolasch & Birch, LLP

(57) ABSTRACT

Provided is a fast image reading lens system capable of achieving compactness and satisfactorily correcting various aberrations. The image reading lens system includes, in order from an object side: a positive first lens of which a convex surface faces toward the object side; a second lens formed as a biconcave lens; a third lens formed as a biconvex lens; a positive fourth lens of which a convex surface faces toward an image side; and a negative fifth lens of which a convex surface faces toward the image side. Assuming that a focal length of the whole lens system is f, a focal length of the fourth lens is f4, and a space between an image side surface of the fourth lens and an object side surface of the fifth lens on an optical axis is D8, the lens system satisfies the following conditional expressions: $0.06 < D8/f < 0.16$, and $0.77 < f4/f < 1.81$.

4 Claims, 12 Drawing Sheets

13 (IMAGE READING LENS)

FIG.8A
F4.5
— e-LINE
—- g-LINE
---- C-LINE
-0.2mm  0.2mm
SPHERICAL
ABERRATION

FIG.8B
18.3°
— SAGITTAL
---- TANGENTIAL
-0.2mm  0.2mm
ASTIGMATISM

FIG.8C
18.3°
-0.2%  0.2%
DISTORTION

FIG.8D
18.3°
—- g-LINE
---- C-LINE
-0.05mm  0.05mm
LATERAL
CHROMATIC
ABERRATION

14 (IMAGE READING LENS)

15(IMAGE READING LENS)

16(IMAGE READING LENS)

IMAGE READING LENS SYSTEM AND IMAGE READING APPARATUS

CROSS-REFERENCE TO RELATED APPLICATIONS

This application is based upon and claims the benefit of priority from the Japanese Patent Application No. 2009-151148 filed on Jun. 25, 2009; the entire contents of which are incorporated herein by reference.

BACKGROUND OF THE INVENTION

1. Field of the Invention

The present invention relates to an image reading apparatus such as an image scanner and an image reading lens system mounted on the image reading apparatus.

2. Description of the Related Art

Generally, image reading apparatuses such as copiers, facsimiles, and image scanners for reading an original image such as a document or an image and converting the image into digital image data have come into widespread use. In such image reading apparatuses, by using an imaging lens system (hereinafter referred to as an image reading lens system), the original image is formed on, for example, a CCD image sensor. In order to acquire image data with high fidelity to the original image, in the image reading lens system, various aberrations are suppressed with good balance, and thus a high resolving power is demanded. Furthermore, high aperture efficiency is demanded even in the corner of the screen.

Further, recently, in accordance with reduction in the size and cost of the image reading apparatuses, the image reading lens system has been further demanded to be reduced in size and cost. Further, in accordance with an increase in the image reading speed of the image reading apparatus, a faster (smaller F number) image reading lens system is demanded.

As the compact image reading lens system, there has been known a telephoto type lens system having four groups and four elements (for example, refer to JP-A-9-101452). Further, as the faster image reading lens system, there has been known a Gauss type lens system having four groups and six elements (for example, refer to JP-A-9-113802). Furthermore, as disclosed in JP-A-2000-241701, there has been an image reading lens system capable of achieving both of an increase in speed and reduction in size by adopting a configuration having five groups and five elements.

SUMMARY OF THE INVENTION

However, the image reading lens system which has four groups and four elements in JP-A-9-101452 is not able to correct chromatic aberrations sufficiently, and is inappropriate for reading of a color original image. Further, the image reading lens system having this configuration has a problem in that it is difficult to obtain a sufficient resolving power when the lens system is formed as a faster lens system. Further, the image reading lens system which has six groups and four elements in JP-A-9-113802 is formed as a fast lens system, in which it is difficult to make the diameter of the lens small, and thus the system is disadvantageous for compactness. For this reason, configurations for reducing the height of the lens by cutting the upper and lower ends of the lens respectively have also been contrived. However, there is still a problem in that it is difficult to rotate the lens in order to adjust the eccentricity thereof. In addition, the configuration having five groups and five elements in JP-A-2000-241701 has a problem in that correction of coma aberration is insufficient.

The invention has been made in view of the above-mentioned problems, and its object is to provide a low-cost, compact, and fast image reading lens system capable of maintaining high aperture efficiency up to the corner of a screen, correcting various aberrations with excellent balance, and having a high resolving power, and to provide an image reading apparatus having the image reading lens system.

In order to achieve the object, according to an aspect of the invention, an image reading lens system includes, in order from an object side: a positive first lens of which a convex surface faces toward the object side; a second lens formed as a biconcave lens; a third lens formed as a biconvex lens; a positive fourth lens of which a convex surface faces toward an image side; and a negative fifth lens of which a convex surface faces toward the image side. Assuming that a focal length of the whole lens system is f, a focal length of the fourth lens is f4, and a space between an image side surface of the fourth lens and an object side surface of the fifth lens on an optical axis is D8, the lens system satisfies the following conditional expressions (1) and (2):

$$0.06 < D8/f < 0.16 \qquad (1), \text{ and}$$

$$0.77 < f4/f < 1.81 \qquad (2).$$

The positive fourth lens of which a convex surface faces toward the image side may be a biconvex lens of which a convex surface faces toward the object side, or may be a lens of which the concave surface or the flat surface faces toward the object side. When the fourth lens is formed as a biconvex lens, it is more preferable to satisfy the following conditional expressions: "$0.06 < D8/f < 0.14$", and "$0.77 < f4/f < 1.59$". When the fourth lens is formed as a lens of a concave or flat surface and faces toward the object side, it is further more preferable to satisfy the following conditional expressions: "$0.10 < D8/f < 0.16$", and "$1.06 < f4/f < 1.81$".

Further, assuming that a refractive index of a j-th lens at the e-line is Nj, it is preferable that the image reading lens system according to the aspect should satisfy the following conditional expression (3):

$$1.55 < (N1+N3+N4)/3 < 1.74 \qquad (3).$$

In other words, it is preferable that the average of refractive indices of the first, third, and fourth lenses which are positive lenses, that is, "(N1+N3+N4)/3" should satisfy the condition of the expression (3).

Furthermore, assuming that an Abbe number of the j-th lens at the d-line is vj, the image reading lens system according to the aspect should satisfy the following conditional expression (4):

$$13.5 < (v1+v3+v4)/3 - (v2+v5)/2 \qquad (4).$$

Specifically, it is preferable that the difference between the average of the Abbe numbers of the positive lenses and the average of the Abbe numbers of the negative lenses, that is, "(v1+v3+v4)/3−(v2+v5)/2" should satisfy the condition of the expression (4).

Any one of the conditional expressions (3) and (4) may be satisfied, but it is more preferable that both of them should be satisfied.

According to another aspect of the invention, an image reading apparatus includes the above-mentioned image reading lens system.

According to the aspects of the invention, the image reading lens system is able to maintain high aperture efficiency up to the corner of screen, sufficiently correct various aberrations with excellent balance, and thereby obtain a high resolving power while having a low-cost and compact configuration. Further, by using the image reading lens system, it is possible to embody an image reading apparatus capable of increasing the reading speed thereof without lowering the optical performance thereof while achieving compactness.

DESCRIPTION OF THE PREFERRED EMBODIMENTS

Figure 1:
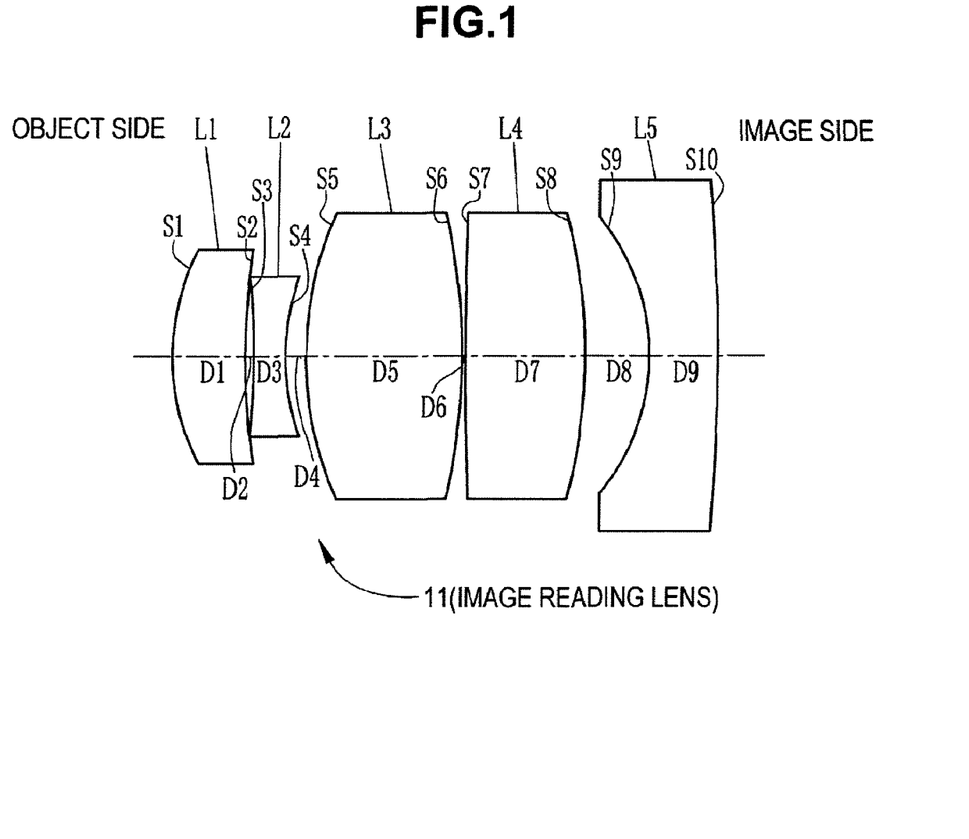
FIG. 1 is a sectional view illustrating a configuration of an image reading lens system according to Example 1.

FIG. 1 shows an image reading lens system 11 used in an image reading apparatuses. The image reading lens system 11 forms images of original documents, which are placed at a predetermined interval so as to be close to the object side, on image sensors which are arranged at a predetermined interval so as to be close to the image side.

The image reading lens system 11 has a five-group five-element configuration in which first lens L1 to fifth lens L5 are arranged in order from the object side. The first lens L1 is a lens which has a positive refractive power and of which a convex surface faces toward the object side. The second lens L2 is formed as a biconcave lens, and the third lens L3 is formed as a biconvex lens. The fourth lens L4 is formed as a lens which has a positive refractive power and of which a convex surface faces toward the image side. The fifth lens L5 is a lens which has a negative refractive power and of which a convex surface faces toward the image side.

When the fourth lens L4 has a positive refractive power and of which a convex surface faces toward the image side, it may be a biconvex lens of which a convex surface faces toward the object side, may be a plano-convex lens of which the flat surface faces toward the object side, or may be a meniscus lens of which a concave surface faces toward the object side. Furthermore, in the lens configuration of FIG. 1, the fourth lens L4 is formed as a biconvex lens.

Assuming that a focal length of the whole lens system is f, a focal length of the fourth lens L4 is f4, and a space between the image side surface of the fourth lens L4 and the object side surface of the fifth lens L5 on an optical axis is D8, the image reading lens system 11 is configured to satisfy the following conditional expressions.

$$0.06 < D8/f < 0.16 \tag{1}$$

$$0.77 < f4/f < 1.81 \tag{2}$$

The Conditional Expression (1) defines a ratio "D8/f" of the space D8 between the fourth lens L4 and the fifth lens L5 to the focal length f of the whole system of the image reading lens system 11. When the value of "D8/f" is set to be large, this is advantageous for correction of image field curvature and coma aberration. However, when the value is more than the upper limit of the Conditional Expression (1), the total length of the image reading lens system 11 increases, and thus it is difficult to achieve compactness. Further, when the value of "D8/f" is set to be small, this is advantageous for compactness of the image reading lens system 11. However, when the value is less than the lower limit of the Conditional Expression (1), it is difficult to correct image field curvature and coma aberration satisfactorily.

The Conditional Expression (2) is a condition relating to distortion, and defines a ratio "f4/f" of the focal length f4 of the fourth lens L4 to the focal length f of the whole system of the image reading lens system 11. When the value of "f4/f" is more than the upper limit of the Conditional Expression (2), distortion increases in the direction of "+". In contrast, when the value is less than the lower limit, the distortion increases in the direction of "−". Thus, these are not preferable.

Similarly to the image reading lens system 11 shown in FIG. 1, the fourth lens L4 may be formed as a biconvex lens. In this case, it is more preferable to satisfy the following Conditional Expressions (1a) and (2a).

$$0.06 < D8/f < 0.14 \tag{1a}$$

$$0.77 < f4/f < 1.59 \tag{2a}$$

Further, the fourth lens L4 may be formed as a plano-convex lens or a meniscus lens of which a flat surface or a concave surface faces toward the object side. In this case, it is more preferable to satisfy the following Conditional Expressions (1b) and (2b).

$$0.10 < D8/f < 0.16 \quad (1b)$$

$$1.06 < f4/f < 1.81 \quad (2b)$$

Further, in the image reading lens system 11, when j=1, 2, . . . 5, a refractive index of a j-th lens at the e-line (a wavelength of 546.07 nm) is defined as Nj, and an Abbe number of the j-th lens at the d-line (a wavelength of 587.56 nm) is defined as vj. In this case, it is preferable to satisfy the following Conditional Expressions (3) and (4). The system may be configured so as to satisfy any one of the Conditional Expressions (3) and (4). However, it is more preferable that the system should be configured to satisfy both of them simultaneously.

$$1.55 < (N1+N3+N4)/3 < 1.74 \quad (3)$$

$$13.5 < (v1+v3+v4)/3 - (v2+v5)/2 \quad (4)$$

The Conditional Expression (3) is a condition relating to lateral chromatic aberration and aperture efficiency, and defines an average value "(N1+N3+N4)/3" of the refractive index N1, the refractive index N3, and the refractive index N4 of the first lens L1, the third lens L3, and the fourth lens L4 which are positive lenses. When the value of "(N1+N3+N4)/3" is more than the upper limit of the Conditional Expression (3), the aperture efficiency decreases, and this causes deterioration in relative illumination. In contrast, when the value is less than the lower limit thereof, it is difficult to correct lateral chromatic aberration satisfactorily.

The Conditional Expression (4) is a condition relating to longitudinal chromatic aberration, and defines a difference "(v1+v3+v4)/3−(v2+v5)/2" between the average value of the Abbe numbers v1, v3, and v4 of the first lens L1, the third lens L3, and the fourth lens L4 which are positive lenses and the average value of the Abbe numbers v2 and v5 of the second lens L2 and the fifth lens L5 which are negative lenses. When the value of "(v1+v3+v4)/3−(v2+v5)/2" is less than the lower limit of the Conditional Expression (4), it is difficult to correct longitudinal chromatic aberration satisfactorily.

As described above the image reading lens system 11 is configured to have five groups and five elements, and to satisfy the conditional expressions. With such a configuration, in the image reading lens system, various aberrations, particularly, image field curvature is appropriately corrected. Thus, it is possible to obtain a high resolving power of, for example, about 600 dpi and a speed of F 5.0 or less, and maintain an aperture efficiency of nearly 100% even in the most-peripheral portion, and it is also possible to achieve compactness by adopting the configuration having five groups and five elements.

Furthermore, the image side and the object side of the image reading lens system 11 may be reversed. In other words, in order from the image side, the first lens L1, the second lens L2, the third lens L3, the fourth lens L4, and the fifth lens L5 may be arranged. In this case, the lens system can be used as an image magnification lens. Further, the lens surfaces of the lenses L1 to L5 may be formed to be aspheric. In this case, by employing the aspheric surface, it is possible to perform more favorable correction.

EXAMPLES

Examples 1 to 6 of the image reading lens system according to the embodiment of the invention will be described in detail. Hereinafter, in Example 1 to 6, the elements and spaces will be referenced by common reference numerals and signs. Further, in Examples 1 to 6, when the surface number i (i=1 to 12) is given in increasing order from the object side lens surface of the first lens L1, each surface of the lenses is represented by Si, and the radius of curvature of the lens surface Si is represented by Ri (mm). Further, the space between the lens surface Si and the lens surface S(i+1), which are adjacent to each other, on the optical axis, that is, the on-axis surface spacing is represented by Di (mm). In addition, the refractive index of each lens at the e-line is represented by N, and the Abbe number at the d-line is represented by v.

Example 1

Example 1 is the image reading lens system 11 shown in FIG. 1. Specifically, the lens system has a five-group five-element configuration in which the first to fifth lenses L1 to L5 are arranged. The first lens L1 is formed as a lens which has a positive refractive power and of which a convex surface faces toward the object side. The second lens L2 is formed as a biconcave lens, the third lens L3 and the fourth lens L4 are formed as biconvex lenses, and the fifth lens L5 is formed as a negative lens of which a convex surface faces toward the image side. Table 1 shows lens data in Example 1. Further, Table 2 shows the focal length f (mm) of the whole system, the F number, the angle of view 2ω (°), and the imaging magnification β of the image reading lens system 11.

TABLE 1

| SURFACE NUMBER (Si) | RADIUS OF CURVATURE (mm) (Ri) | ON-AXIS SURFACE SPACING (mm) (Di) | REFRACTIVE INDEX (e-LINE) (N) | ABBE NUMBER (d-LINE) (v) |
|---|---|---|---|---|
| 1 | 13.371 | 4.22 | 1.71615 | 63.4 |
| 2 | 43.112 | 0.49 | | |
| 3 | −44.124 | 1.34 | 1.65222 | 33.8 |
| 4 | 13.977 | 1.70 | | |
| 5 | 20.218 | 9.00 | 1.71615 | 63.4 |
| 6 | −36.988 | 0.20 | | |
| 7 | 236.730 | 6.97 | 1.71615 | 63.4 |
| 8 | −32.538 | 3.76 | | |
| 9 | −12.377 | 3.98 | 1.61669 | 44.3 |
| 10 | −117.370 | | | |

TABLE 2

| f (mm) | F NUMBER | 2ω (°) | IMAGING MAGNIFICATION β |
|---|---|---|---|
| 34.58 | 4.5 | 47.5 | 0.11 |

The focal length f4 of the fourth lens L4 according to Example 1 is "40.38 (mm)". The numerical values corresponding to the Conditional Expressions (1) to (4) in Example 1 are set to satisfy the Conditional Expressions (1) to (4) and the Conditional Expressions (1a) and (2a) as shown in Table 3.

TABLE 3

| D8/f | 0.109 |
|---|---|
| f4/f | 1.168 |
| (N1 + N3 + N4)/3 | 1.716 |
| (v1 + v3 + v4)/3 − (v2 + v5)/2 | 24.4 |

Figures 2A, 2B, 2C:
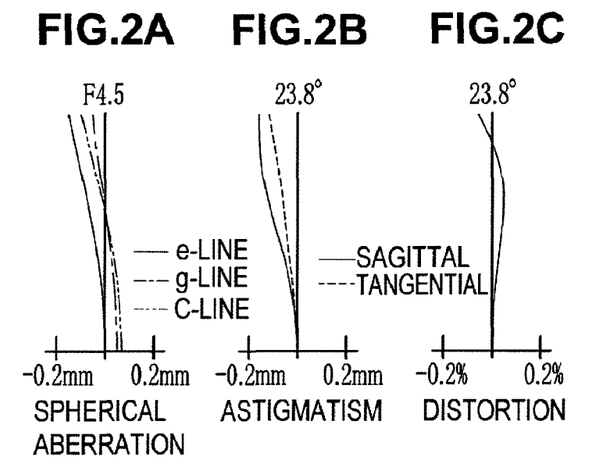
FIGS. 2A to 2D are aberration diagrams illustrating spherical aberration, astigmatism, distortion, and lateral chromatic aberration of the image reading lens system according to Example 1.
Figure 2D:
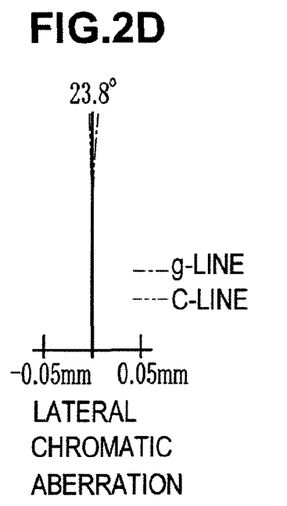
Figure 3A:
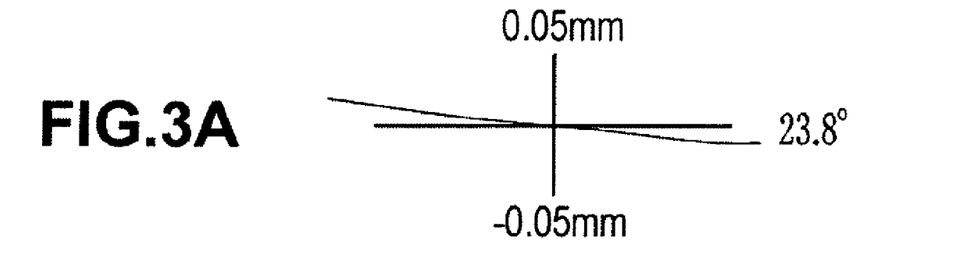
FIGS. 3A to 3D are aberration diagrams illustrating lateral aberrations of the image reading lens system according to Example 1.
Figure 3B:
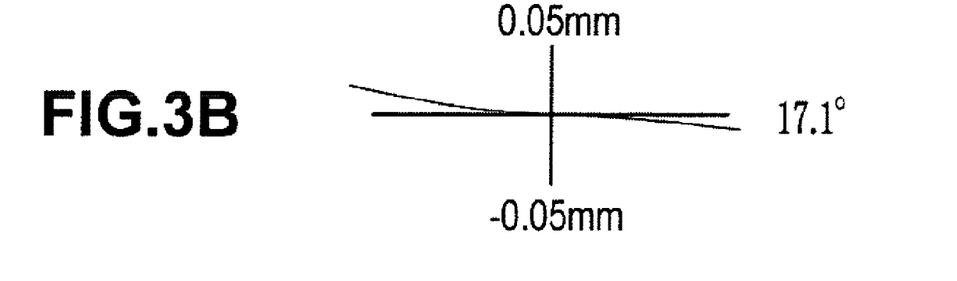
Figure 3C:
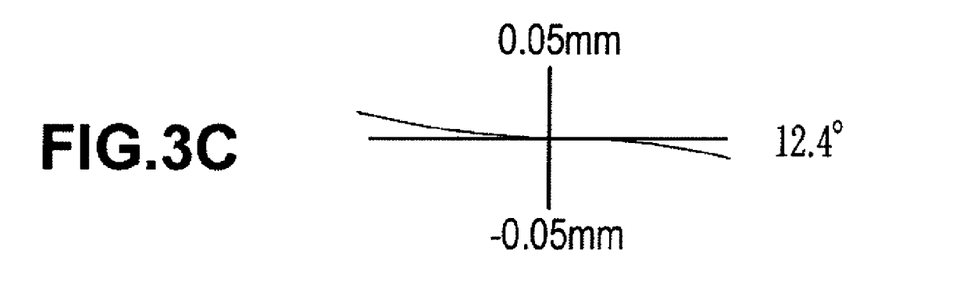
Figure 3D:
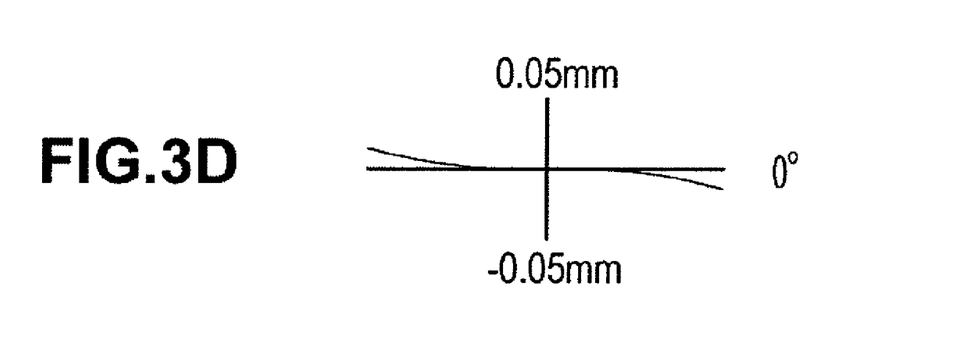

FIGS. 2A to 2D and 3A to 3D show various aberrations of the image reading lens system 11. FIG. 2A shows spherical aberration, FIG. 2B shows astigmatism, FIG. 2C shows distortion (distortion aberration), and FIG. 2D shows lateral chromatic aberration. In the spherical aberration diagram of FIG. 2A, the spherical aberration at the e-line is indicated by the solid line, the aberration at the g-line (a wavelength of 435.84 nm) is indicated by the chain line, and the aberration at the C-line (a wavelength of 656.28 nm) is indicated by the chain double-dashed line. In the astigmatism diagram of FIG. 2B, the aberration on the sagittal image plane is indicated by the solid line, and the aberration on the tangential image plane is indicated by the dashed line. In the lateral chromatic aberration diagram of FIG. 2D, when the e-line is set as a reference, the aberration at the g-line is indicated by the chain line, and the aberration at the C-line is indicated by the chain double-dashed line.

Further, FIGS. 3A to 3D show lateral aberrations. Specifically, FIGS. 3A to 3D show lateral aberrations at the e-line when the angle of view is 23.8°, 17.1°, 12.4°, and 0° (on the axis).

Example 2

Figure 4:
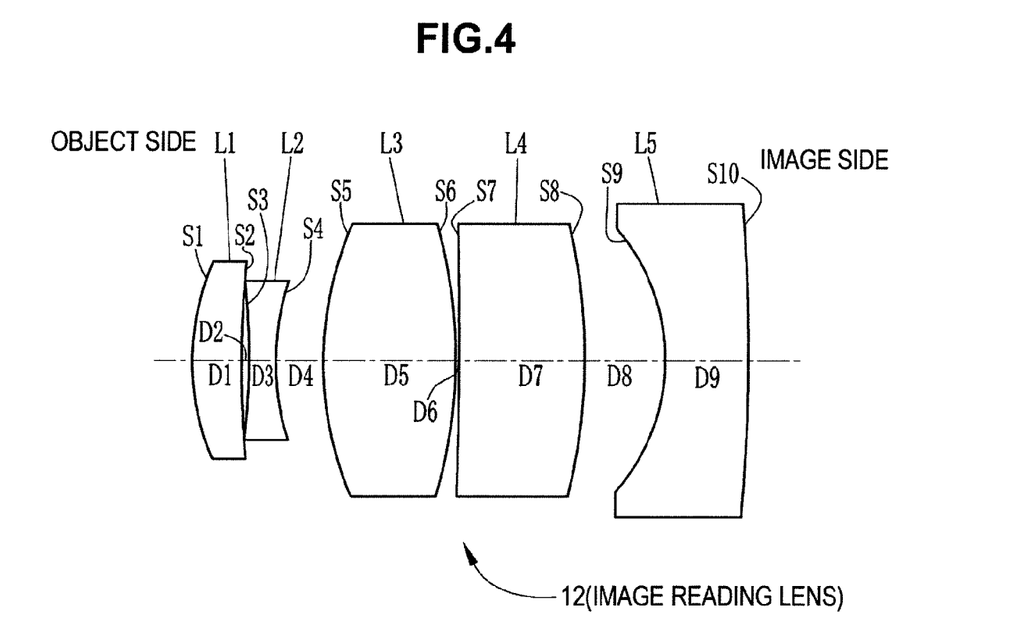
FIG. 4 is a sectional view illustrating a configuration of an image reading lens system according to Example 2.

The image reading lens system 12 according to Example 2 shown in FIG. 4 has a five-group five-element configuration in which first lens L1 to fifth lens L5 are arranged in order from the object side. The first lens L1 is a lens which has a positive refractive power and of which a convex surface faces toward the object side. The second lens L2 is formed as a biconcave lens, and the third lens L3 is formed as a biconvex lens. The fourth lens L4 is formed as a positive meniscus lens of which a concave surface faces toward the object side and of which a convex surface faces toward the image side. The fifth lens L5 is a negative lens of which a convex surface faces toward the image side.

Table 4 shows lens data of the image reading lens system 12. Further, Table 5 shows the focal length f (mm) of the whole system, the F number, the angle of view 2ω (°), and the imaging magnification β of the image reading lens system 12. The focal length f4 of the fourth lens L4 according to Example 2 is "52.70 (mm)". The numerical values corresponding to the Conditional Expressions (1) to (4) are set to satisfy the Conditional Expressions (1) to (4) as shown in Table 6. Further, the values are also set to satisfy the Conditional Expressions (1b) and (2b).

TABLE 4

| SURFACE NUMBER (Si) | RADIUS OF CURVATURE (mm) (Ri) | ON-AXIS SURFACE SPACING (mm) (Di) | REFRACTIVE INDEX (e-LINE) (N) | ABBE NUMBER (d-LINE) (ν) |
|---|---|---|---|---|
| 1 | 15.179 | 3.00 | 1.71615 | 53.9 |
| 2 | 66.033 | 0.45 | | |
| 3 | −42.266 | 1.64 | 1.62409 | 36.3 |
| 4 | 16.111 | 2.87 | | |
| 5 | 21.030 | 7.95 | 1.62287 | 60.3 |
| 6 | −30.227 | 0.22 | | |
| 7 | −260.389 | 7.67 | 1.75844 | 52.3 |
| 8 | −35.089 | 4.89 | | |
| 9 | −12.146 | 4.99 | 1.61669 | 44.3 |
| 10 | −110.120 | | | |

TABLE 5

| f (mm) | F NUMBER | 2ω (°) | IMAGING MAGNIFICATION β |
|---|---|---|---|
| 39.75 | 5 | 41.9 | 0.11 |

TABLE 6

| D8/f | 0.123 |
|---|---|
| f4/f | 1.326 |
| (N1 + N3 + N4)/3 | 1.699 |
| (ν1 + ν3 + ν4)/3 − (ν2 + ν5)/2 | 15.2 |

Figure 5A:
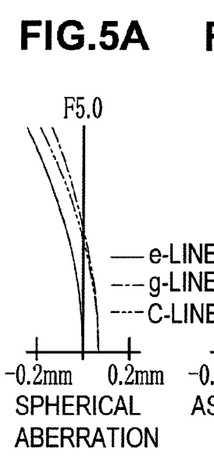
FIGS. 5A to 5D are aberration diagrams illustrating spherical aberration, astigmatism, distortion, and lateral chromatic aberration of the image reading lens system according to Example 2.
Figures 5B, 5C:
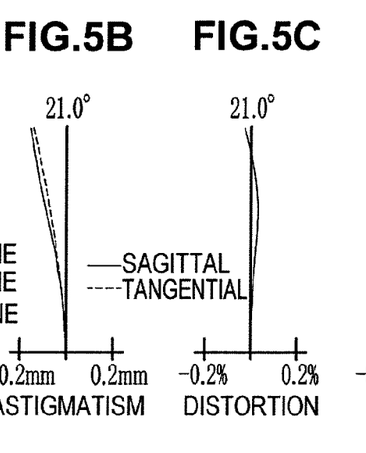
Figure 5D:
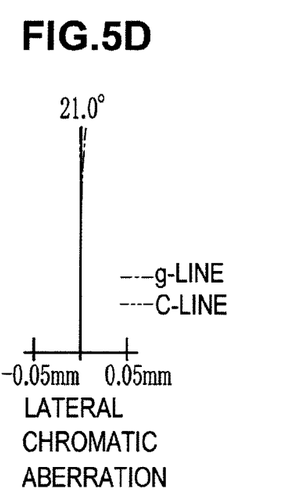
Figure 6A:
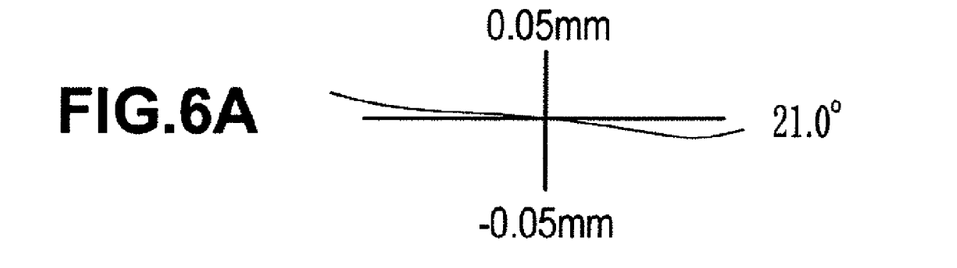
FIGS. 6A to 6D are aberration diagrams illustrating lateral aberrations of the image reading lens system according to Example 2.
Figure 6B:
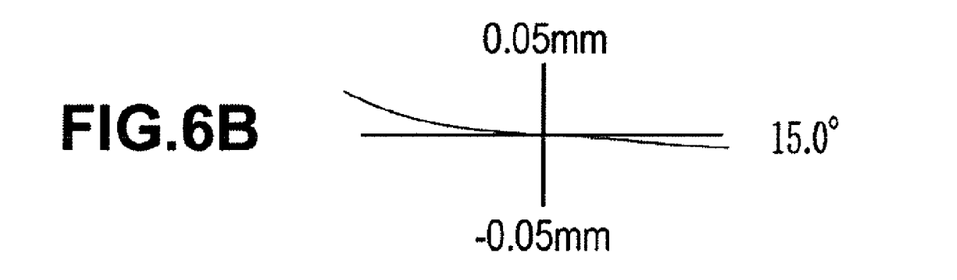
Figure 6C:
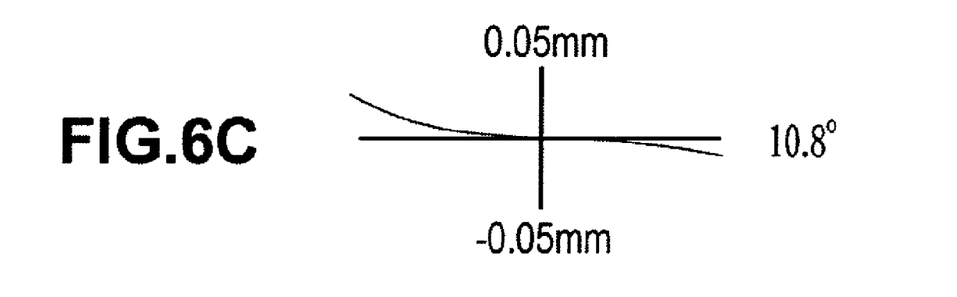
Figure 6D:
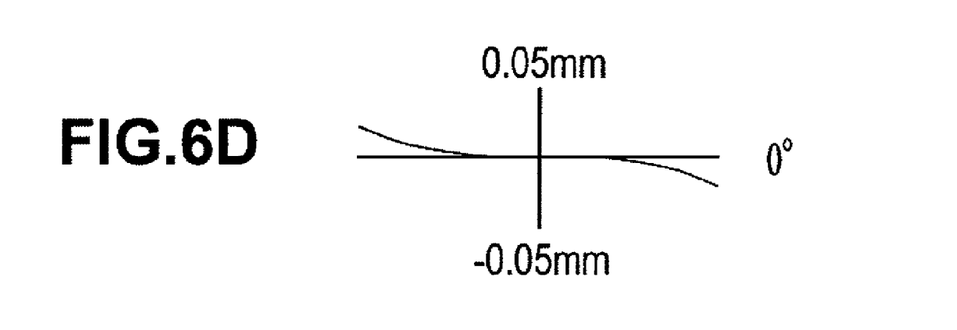

Further, FIG. 5A shows spherical aberration of the image reading lens system 12, FIG. 5B shows astigmatism thereof, FIG. 5C shows distortion (distortion aberration) thereof, and FIG. 5D shows lateral chromatic aberration thereof. FIGS. 6A to 6D show lateral aberrations at the e-line when the angle of view is 21.0°, 15.0°, 10.8°, and 0° (on the axis).

Example 3

Figure 7:
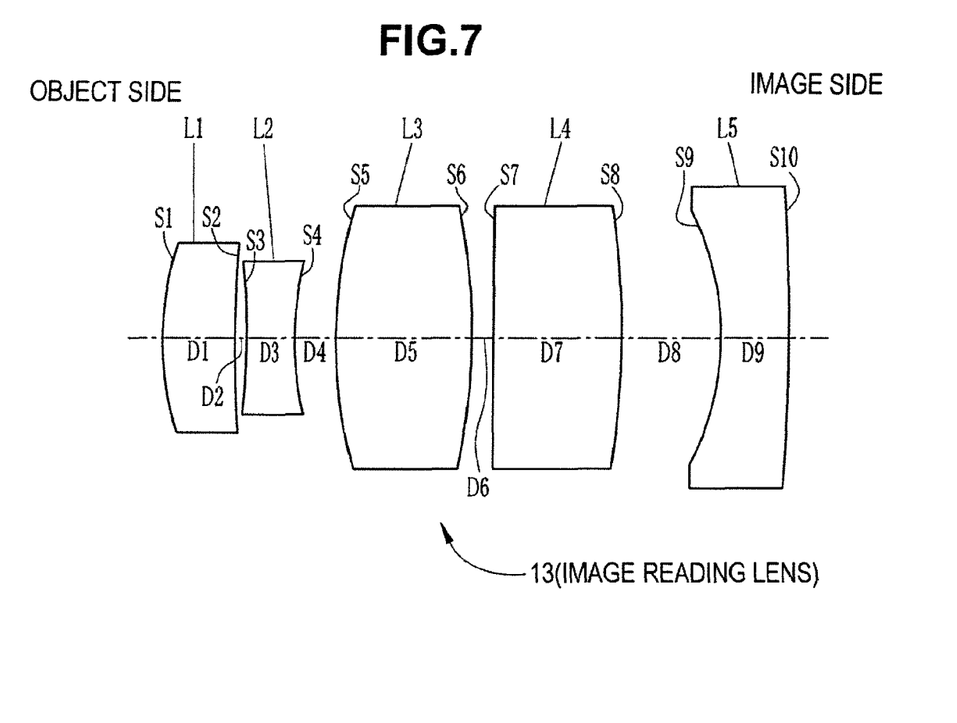
FIG. 7 is a sectional view illustrating a configuration of an image reading lens system according to Example 3.

The image reading lens system 13 according to Example 3 shown in FIG. 7 has a five-group five element configuration in which the first lens L1 to fifth lens L5 are arranged similarly to Example 2. However, the lens system is different in that the fourth lens L4 is formed as a positive piano-convex lens of which a flat surface faces toward the object side and of which a convex surface faces toward the image side.

Table 7 shows lens data of the image reading lens system 13. Further, Table 8 shows the focal length f (mm) of the whole system, the F number, the angle of view 2ω (°), and the imaging magnification β of the image reading lens system 13. The focal length f4 of the fourth lens L4 according to Example 3 is "70.42 (mm)".

The numerical values corresponding to the Conditional Expressions (1) to (4) are set to satisfy the Conditional Expressions (1) to (4) as shown in Table 9. Further, the values are also set to satisfy the Conditional Expressions (1b) and (2b).

TABLE 7

| SURFACE NUMBER (Si) | RADIUS OF CURVATURE (mm) (Ri) | ON-AXIS SURFACE SPACING (mm) (Di) | REFRACTIVE INDEX (e-LINE) (N) | ABBE NUMBER (d-LINE) (ν) |
|---|---|---|---|---|
| 1 | 18.699 | 4.74 | 1.71615 | 53.9 |
| 2 | 74.904 | 0.79 | | |
| 3 | −46.239 | 3.19 | 1.65222 | 33.8 |
| 4 | 19.567 | 2.76 | | |
| 5 | 29.516 | 8.92 | 1.71615 | 53.9 |
| 6 | −38.039 | 1.45 | | |
| 7 | 0.000 | 8.43 | 1.71615 | 53.9 |
| 8 | −50.429 | 6.58 | | |
| 9 | −16.729 | 4.53 | 1.61669 | 44.3 |
| 10 | −126.000 | | | |

TABLE 8

| f (mm) | F NUMBER | 2ω (°) | IMAGING MAGNIFICATION β |
|---|---|---|---|
| 46.62 | 4.5 | 36.5 | 0.11 |

TABLE 9

| D8/f | 0.141 |
|---|---|
| f4/f | 1.511 |
| (N1 + N3 + N4)/3 | 1.716 |
| (ν1 + ν3 + ν4)/3 − (ν2 + ν5)/2 | 14.9 |

Figure 8A:
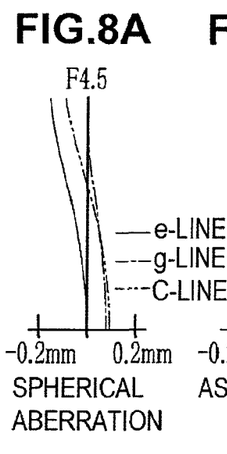
FIGS. 8A to 8D are aberration diagrams illustrating spherical aberration, astigmatism, distortion, and lateral chromatic aberration of the image reading lens system according to Example 3.
Figures 8B, 8C:
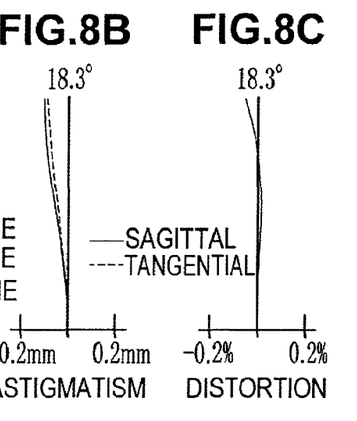
Figure 8D:
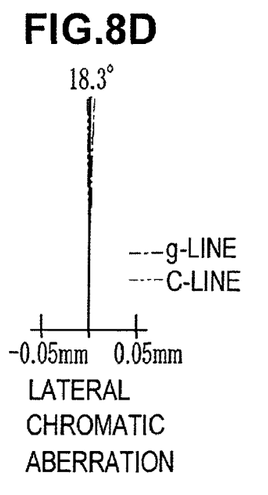
Figure 9:
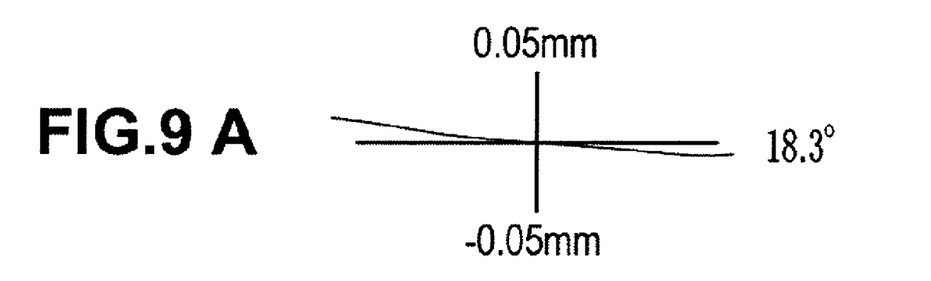
FIGS. 9A to 9D are aberration diagrams illustrating lateral aberrations of the image reading lens system according to Example 3.

Further, FIG. 8A shows spherical aberration of the image reading lens system 13, FIG. 8B shows astigmatism thereof, FIG. 8C shows distortion (distortion aberration) thereof, and FIG. 8D shows lateral chromatic aberration thereof. FIGS. 9A to 9D show lateral aberrations at the e-line when the angle of view is 18.3°, 13.0°, 9.4°, and 0° (on the axis).

Example 4

Figure 10:
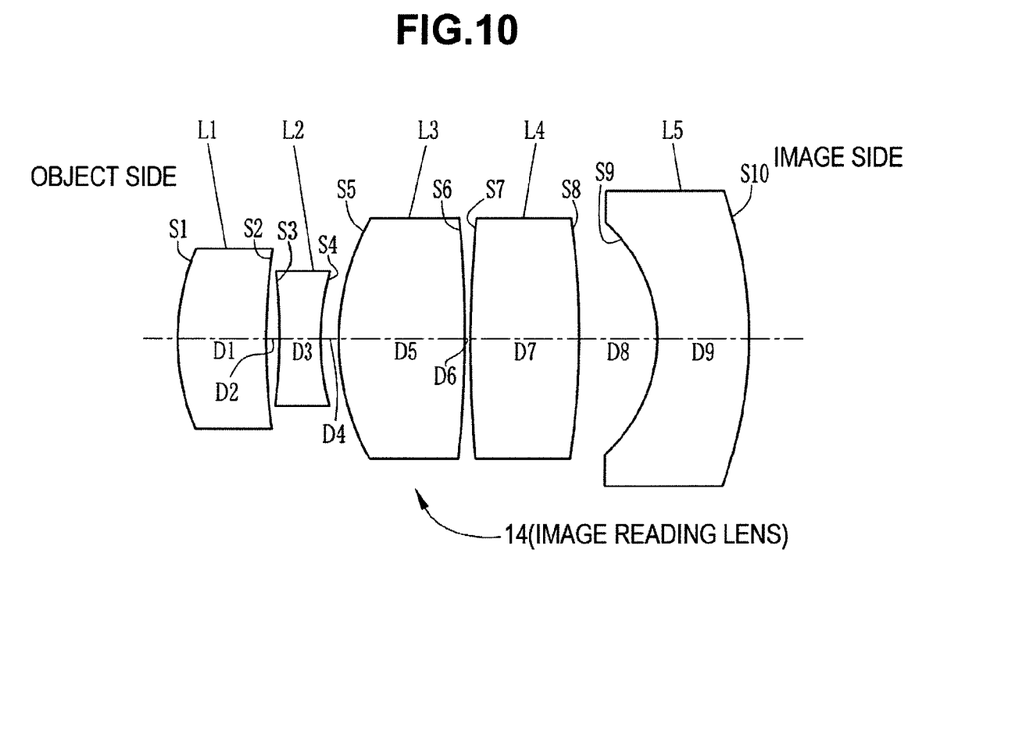
FIG. 10 is a sectional view illustrating a configuration of an image reading lens system according to Example 4.

The image reading lens system 14 according to Example 4 shown in FIG. 10 has a five-group five element configuration in which the first lens L1 to fifth lens L5 are arranged similarly to Example 1. In the configuration, the fourth lens L4 is formed as a biconvex lens.

Table 10 shows lens data of the image reading lens system 14. Further, Table 11 shows the focal length f (mm) of the whole system, the F number, the angle of view 2ω (°), and the imaging magnification β of the image reading lens system 14. The focal length f4 of the fourth lens L4 according to Example 4 is "45.15 (mm)".

The numerical values corresponding to the Conditional Expressions (1) to (4) are set to satisfy the Conditional Expressions (1) to (4) and the Conditional Expressions (1a) and (2a) as shown in Table 12.

TABLE 10

| SURFACE NUMBER (Si) | RADIUS OF CURVATURE (mm) (Ri) | ON-AXIS SURFACE SPACING (mm) (Di) | REFRACTIVE INDEX (e-LINE) (N) | ABBE NUMBER (d-LINE) (ν) |
|---|---|---|---|---|
| 1 | 16.458 | 5.87 | 1.62033 | 63.4 |
| 2 | 48.007 | 0.88 | | |
| 3 | −39.847 | 2.66 | 1.63003 | 35.7 |
| 4 | 18.292 | 1.18 | | |
| 5 | 17.869 | 8.28 | 1.71615 | 53.9 |
| 6 | −82.942 | 0.38 | | |
| 7 | 96.049 | 7.21 | 1.83932 | 37.2 |
| 8 | −60.441 | 5.16 | | |
| 9 | −10.923 | 6.02 | 1.65222 | 33.8 |
| 10 | −30.927 | | | |

TABLE 11

| f (mm) | F NUMBER | 2ω (°) | IMAGING MAGNIFICATION β |
|---|---|---|---|
| 43.40 | 4.5 | 39.5 | 0.11 |

TABLE 12

| D8/f | 0.119 |
|---|---|
| f4/f | 1.040 |
| (N1 + N3 + N4)/3 | 1.725 |
| (ν1 + ν3 + ν4)/3 − (ν2 + ν5)/2 | 16.8 |

Figures 11A, 11B, 11C:
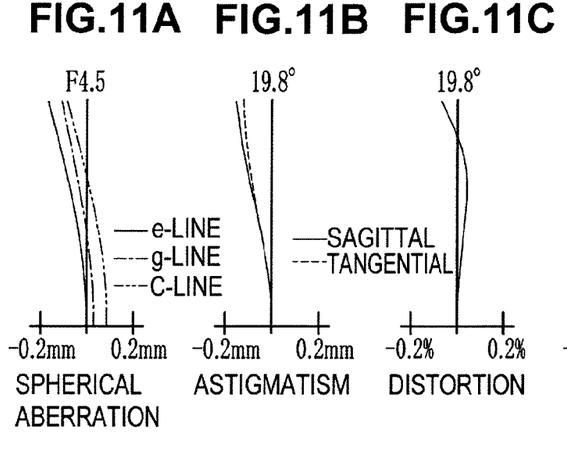
FIGS. 11A to 11D are aberration diagrams illustrating spherical aberration, astigmatism, distortion, and lateral chromatic aberration of the image reading lens system according to Example 4.
Figure 11D:
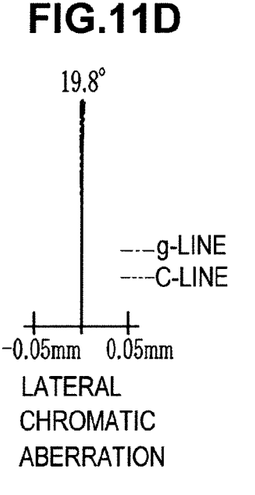
Figure 12A:
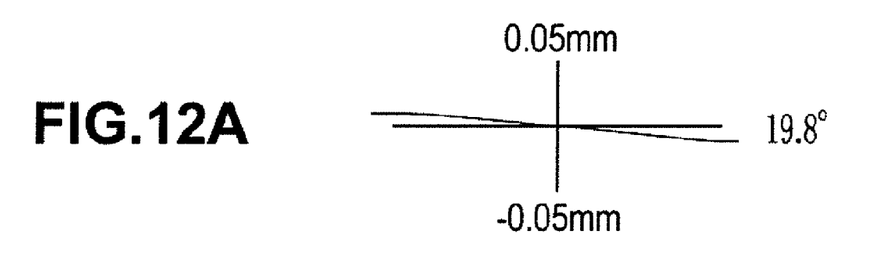
FIGS. 12A to 12D are aberration diagrams illustrating lateral aberrations of the image reading lens system according to Example 4.
Figure 12B:
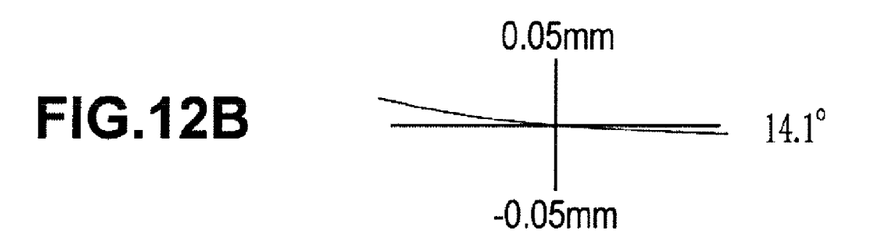
Figure 12C:
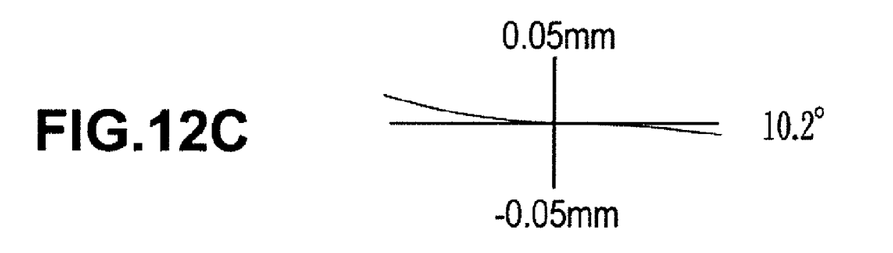
Figure 12D:
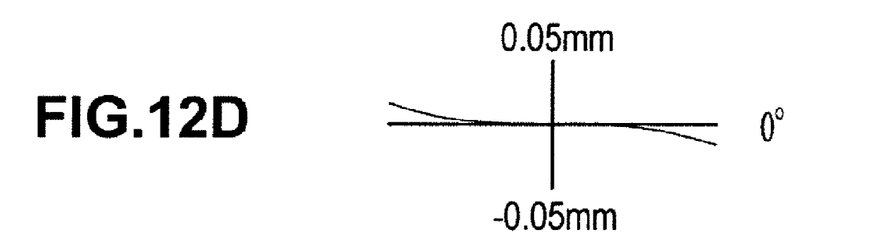

Further, FIG. 11A shows spherical aberration of the image reading lens system 14, FIG. 11B shows astigmatism thereof, FIG. 11C shows distortion (distortion aberration) thereof, and FIG. 11D shows lateral chromatic aberration thereof. FIGS. 12A to 12D show lateral aberrations at the e-line when the angle of view is 19.8°, 14.1°, 10.2°, and 0° (on the axis).

Example 5

Figure 13:
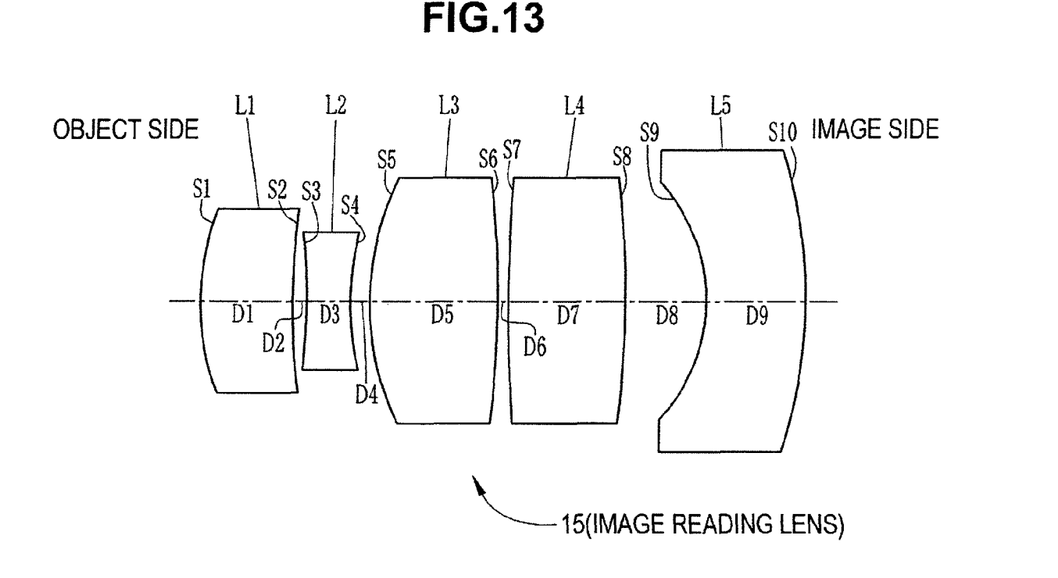
FIG. 13 is a sectional view illustrating a configuration of an image reading lens system according to Example 5.

The image reading lens system 15 according to Example 5 shown in FIG. 13 has a five-group five element configuration in which the first lens L1 to fifth lens L5 are arranged similarly to Example 1. In the configuration, the fourth lens L4 is formed as a biconvex lens.

Table 13 shows lens data of the image reading lens system 15. Further, Table 14 shows the focal length f (mm) of the whole system, the F number, the angle of view 2ω (°), and the imaging magnification β of the image reading lens system 15. The focal length f4 of the fourth lens L4 according to Example 5 is "52.15 (mm)". The numerical values corresponding to the Conditional Expressions (1) to (4) are set to satisfy the Conditional Expressions (1) to (4) and the Conditional Expressions (1a) and (2a) as shown in Table 15.

TABLE 13

| SURFACE NUMBER (Si) | RADIUS OF CURVATURE (mm) (Ri) | ON-AXIS SURFACE SPACING (mm) (Di) | REFRACTIVE INDEX (e-LINE) (N) | ABBE NUMBER (d-LINE) (ν) |
|---|---|---|---|---|
| 1 | 17.585 | 6.09 | 1.62033 | 63.4 |
| 2 | 51.185 | 0.94 | | |
| 3 | −41.950 | 2.88 | 1.63003 | 35.7 |
| 4 | 19.498 | 1.29 | | |
| 5 | 19.233 | 8.55 | 1.71615 | 53.9 |
| 6 | −71.443 | 0.72 | | |
| 7 | 113.978 | 7.80 | 1.83932 | 37.2 |
| 8 | −68.847 | 5.38 | | |
| 9 | −11.765 | 6.64 | 1.65222 | 33.8 |
| 10 | −33.713 | | | |

TABLE 14

| f (mm) | F NUMBER | 2ω (°) | IMAGING MAGNIFICATION β |
|---|---|---|---|
| 46.87 | 4.5 | 36.3 | 0.11 |

TABLE 15

| D8/f | 0.115 |
|---|---|
| f4/f | 1.113 |
| (N1 + N3 + N4)/3 | 1.725 |
| (ν1 + ν3 + ν4)/3 − (ν2 + ν5)/2 | 16.8 |

Figures 14A, 14B, 14C:
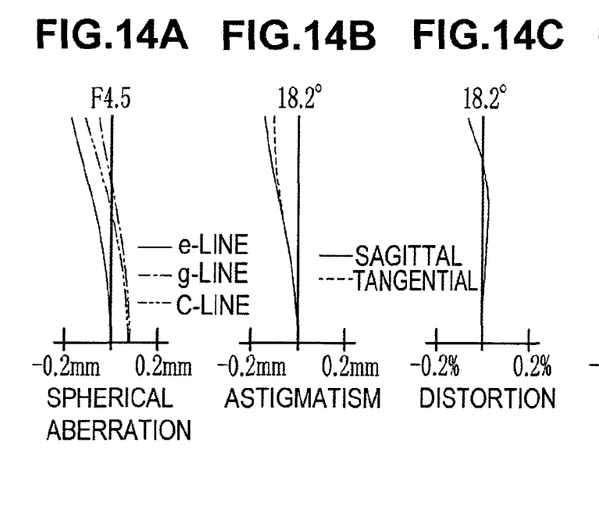
FIGS. 14A to 14D are aberration diagrams illustrating spherical aberration, astigmatism, distortion, and lateral chromatic aberration of the image reading lens system according to Example 5.
Figure 14D:
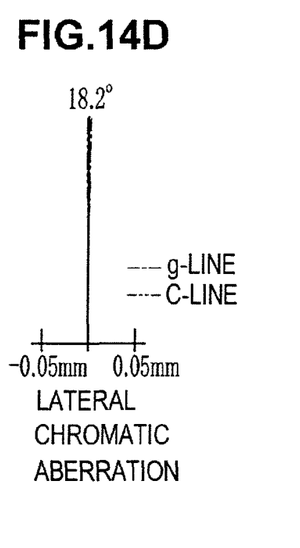
Figure 15A:
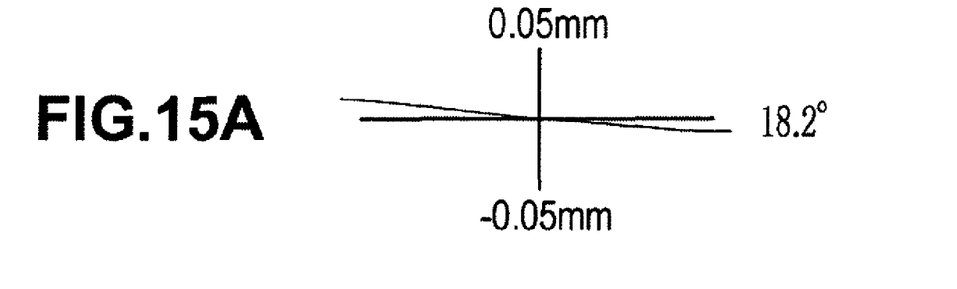
FIGS. 15A to 15D are aberration diagrams illustrating lateral aberrations of the image reading lens system according to Example 5.
Figure 15B:
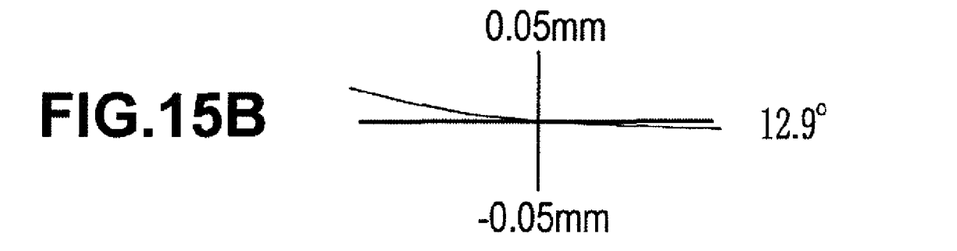
Figure 15C:
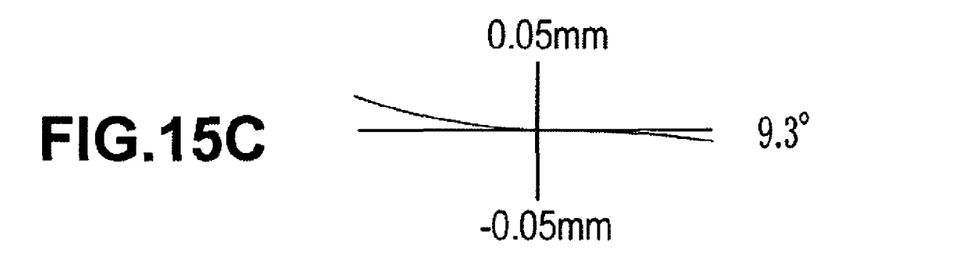
Figure 15D:
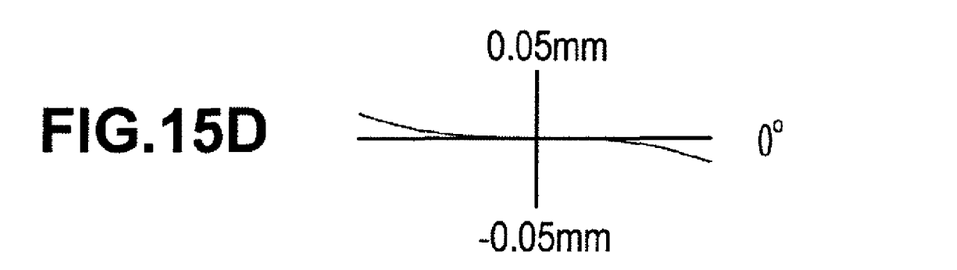

Further, FIG. 14A shows spherical aberration of the image reading lens system 15, FIG. 14B shows astigmatism thereof, FIG. 14C shows distortion (distortion aberration) thereof, and FIG. 14D shows lateral chromatic aberration thereof. FIGS. 15A to 15D show lateral aberrations at the e-line when the angle of view is 18.2°, 12.9°, 9.3°, and 0° (on the axis).

Example 6

Figure 16:
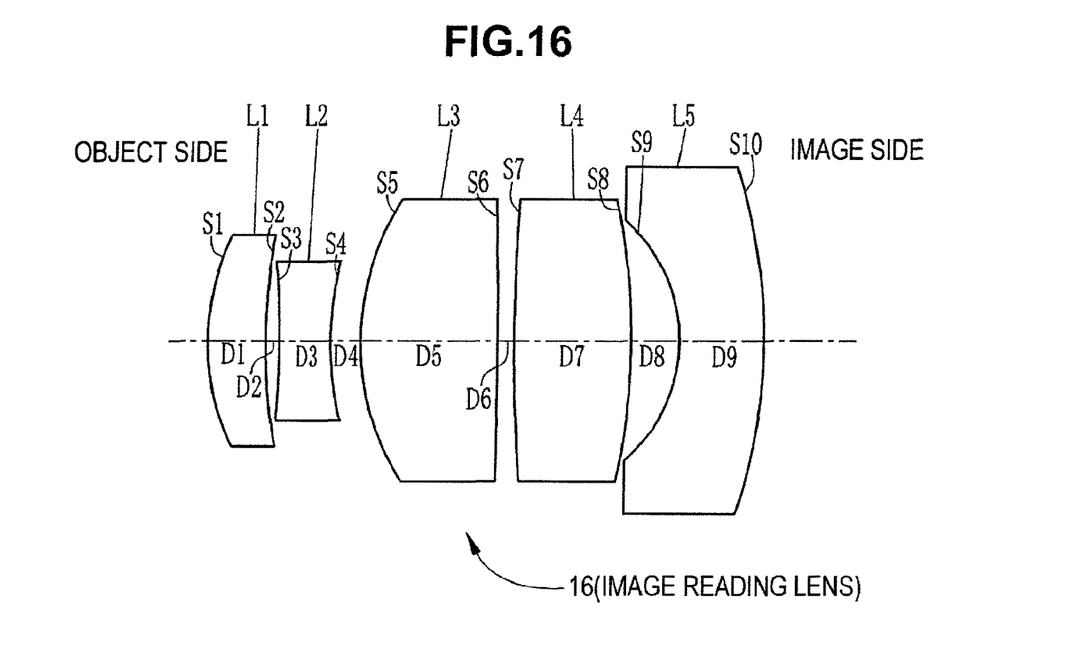
FIG. 16 is a sectional view illustrating a configuration of an image reading lens system according to Example 6.

The image reading lens system 16 according to Example 6 shown in FIG. 16 has a five-group five element configuration in which the first lens L1 to fifth lens L5 are arranged similarly to Example 1. In the configuration, the fourth lens L4 is formed as a biconvex lens.

Table 16 shows lens data of the image reading lens system 16. Further, Table 17 shows the focal length f (mm) of the whole system, the F number, the angle of view 2ω (°), and the imaging magnification β of the image reading lens system 16. The focal length f4 of the fourth lens L4 according to Example 6 is "36.66 (mm)". The numerical values corresponding to the Conditional Expressions (1) to (4) are set to satisfy the Conditional Expressions (1) to (4) and the Conditional Expressions (1a) and (2a) as shown in Table 18.

TABLE 16

| SURFACE NUMBER (Si) | RADIUS OF CURVATURE (mm) (Ri) | ON-AXIS SURFACE SPACING (mm) (Di) | REFRACTIVE INDEX (e-LINE) (N) | ABBE NUMBER (d-LINE) (ν) |
|---|---|---|---|---|
| 1 | 14.661 | 3.34 | 1.62033 | 63.4 |
| 2 | 38.051 | 0.80 | | |
| 3 | −49.643 | 3.00 | 1.63003 | 35.7 |
| 4 | 19.112 | 1.78 | | |
| 5 | 15.517 | 7.96 | 1.73234 | 54.7 |
| 6 | −297.498 | 0.97 | | |
| 7 | 112.626 | 6.79 | 1.80811 | 46.6 |
| 8 | −39.112 | 2.81 | | |
| 9 | −9.328 | 4.96 | 1.65803 | 39.7 |
| 10 | −32.184 | | | |

TABLE 17

| f (mm) | F NUMBER | 2ω (°) | IMAGING MAGNIFICATION β |
|---|---|---|---|
| 39.89 | 5 | 41.8 | 0.11 |

TABLE 18

| D8/f | 0.070 |
|---|---|
| f4/f | 0.919 |
| (N1 + N3 + N4)/3 | 1.720 |
| (ν1 + ν3 + ν4)/3 − (ν2 + ν5)/2 | 17.2 |

Figures 17A, 17B, 17C:
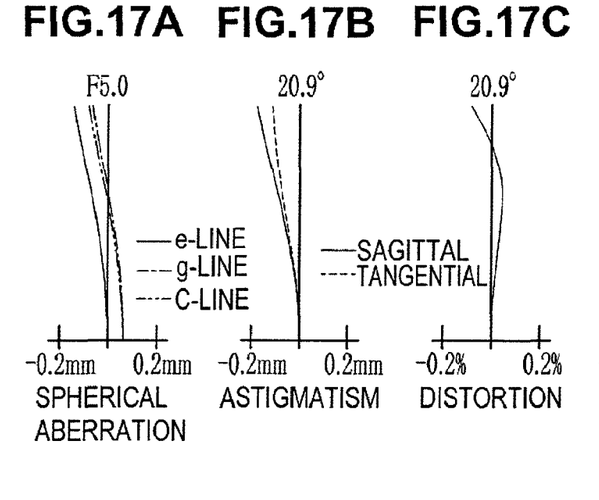
FIGS. 17A to 17D are aberration diagrams illustrating spherical aberration, astigmatism, distortion, and lateral chromatic aberration of the image reading lens system according to Example 6.
Figure 17D:
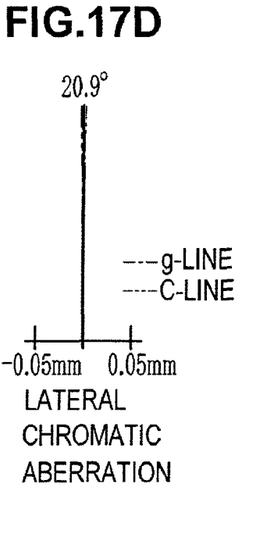
Figure 18A:
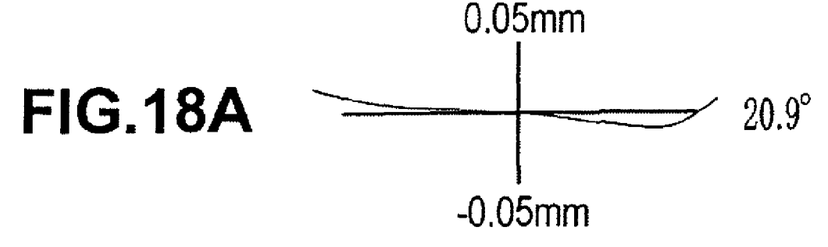
FIGS. 18A to 18D are aberration diagrams illustrating lateral aberrations of the image reading lens system according to Example 6.
Figure 18B:
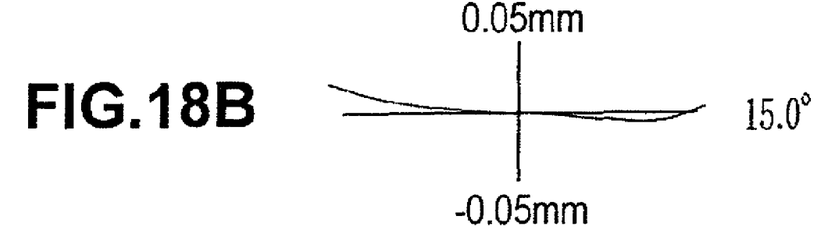
Figure 18C:
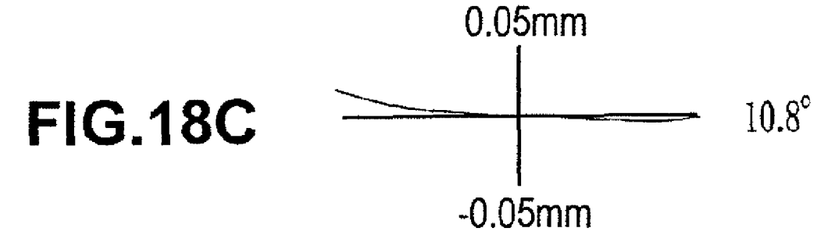
Figure 18D:
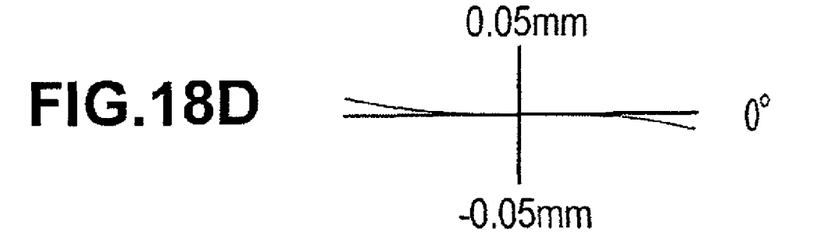

Further, FIG. 17A shows spherical aberration of the image reading lens system 16, FIG. 17B shows astigmatism thereof, FIG. 17C shows distortion (distortion aberration) thereof, and FIG. 17D shows lateral chromatic aberration thereof. FIGS. 18A to 18D show lateral aberrations at the e-line when the angle of view is 20.9°, 15.0°, 10.8°, and 0° (on the axis).

What is claimed is:

1. An image reading lens system comprising, in order from an object side:
   a positive first lens having a convex surface faces directed to the object side;
   a second lens, which is a biconcave lens;
   a third lens, which is a biconvex lens;
   a positive fourth lens having a convex surface faces directed to an image side; and
   a negative fifth lens having a convex surface faces directed to the image side,
   wherein the following conditional expressions (1) and (2) are satisfied:

$$0.06 < D8/f < 0.16 \tag{1}$$

$$0.77 < f4/f < 1.81 \tag{2}$$

where f denotes a focal length of the whole lens system,
   f4 denotes a focal length of the fourth lens, and
   D8 denotes a space between an image side surface of the fourth lens and an object side surface of the fifth lens on an optical axis.

2. The image reading lens system according to claim 1, wherein the following conditional expression (3) is satisfied:

$$1.55 < (N1+N3+N4)/3 < 1.74 \tag{3}$$

where Nj denotes a refractive index of a j-th lens at the e-line.

3. The image reading lens system according to claim 1, wherein the following conditional expression (4) is satisfied:

$$13.5 < (\nu1+\nu3+\nu4)/3 - (\nu2+\nu5)/2 \tag{4}$$

where νj denotes an Abbe number of the j-th lens at the d-line.

4. An image reading apparatus comprising:
   the image reading lens system according to claim 1.

* * * * *